(12) United States Patent
Geva (10) Patent No.: US 7,996,375 B2
(45) Date of Patent: Aug. 9, 2011

(54) RESULT-BASED TRIGGERING FOR PRESENTATION OF ONLINE CONTENT

(75) Inventor: Shai Geva, Tel Aviv (IL)

(73) Assignee: Adobe Systems Incorporated, San Jose, CA (US)

( * ) Notice: Subject to any disclaimer, the term of this patent is extended or adjusted under 35 U.S.C. 154(b) by 345 days.

(21) Appl. No.: 12/372,538

(22) Filed: Feb. 17, 2009

(65) Prior Publication Data

US 2009/0171952 A1 Jul. 2, 2009

Related U.S. Application Data

(63) Continuation of application No. 11/497,219, filed on Jul. 31, 2006, now Pat. No. 7,493,317.

(60) Provisional application No. 60/729,111, filed on Oct. 20, 2005.

(51) Int. Cl.
*G06F 17/30* (2006.01)
(52) U.S. Cl. ............... 707/702; 707/728; 707/E17.04
(58) Field of Classification Search .............. 707/702, 707/706, 728
See application file for complete search history.

(56) References Cited

U.S. PATENT DOCUMENTS

| | | | |
|---|---|---|---|
| 5,544,360 A | 8/1996 | Lewak et al. | |
| 6,041,326 A | 3/2000 | Amro et al. | |
| 6,347,312 B1 | 2/2002 | Byrne et al. | |
| 6,553,367 B2 | 4/2003 | Horovitz et al. | |
| 6,763,349 B1 | 7/2004 | Sacco | |
| 7,035,864 B1 | 4/2006 | Ferrari et al. | |
| 7,062,483 B2 | 6/2006 | Ferrari et al. | |
| 7,325,501 B2 | 1/2008 | Ferrari et al. | |
| 2002/0051020 A1 | 5/2002 | Ferrari et al. | |
| 2003/0097357 A1 | 5/2003 | Ferrari et al. | |
| 2003/0120630 A1 | 6/2003 | Tunkelang | |
| 2004/0117366 A1 | 6/2004 | Ferrari et al. | |
| 2005/0038781 A1 | 2/2005 | Ferrari et al. | |
| 2007/0043627 A1 | 2/2007 | Cooperman | |

OTHER PUBLICATIONS

U.S. Appl. No. 60/729,111.
U.S. Appl. No. 60/850,191.
U.S. Appl. No. 60/168,659.
PCT Patent Application No. PCT/IL2006/001046.
Faceted Metadata for Information Architecture and Search, CHI Course for CHI 2006, by Marti Hearst, et al. http://flamenco.berkeley.edu/talks/chi_course06.pdf.
Newest Mercado Release Provides E-Commerce Merchandisers with More Control, Better Insight, and Greater Impact on Business, http://www.findarticles.com/p/articles/mi_m0EIN/is_2005_August10/ai_n14889203, Aug. 10, 2005.
Internal e-mail correspondence of Mercado Software entitled, "CSN 3.5.0 version is ready (Aug. 1, 2005)".
R.B. Allen, "Retrieval from facet spaces", Electronic publishing, vol. 8(3), 247-257, Sep. 1996.

(Continued)

*Primary Examiner* — Cheryl Lewis
(74) *Attorney, Agent, or Firm* — Robert C. Kowert; Meyertons, Hood, Kivlin, Kowert & Goetzel, P.C.

(57) ABSTRACT

A computer-implemented method for delivering content is provided, including specifying a rule having a trigger and defining a content presentation action, and receiving a search query from a user. The method further includes generating a result set in response to the search query, identifying at least one characteristic of the result set, and comparing the at least one characteristic to the trigger. If the at least one characteristic satisfies the trigger, the content is presented as specified by the content presentation action that is defined by the rule. Other embodiments are also described.

26 Claims, 3 Drawing Sheets

OTHER PUBLICATIONS

G.P. Ellis, et al. "Hilbrowse for Hotels: Bridging the Gap Between User and System Views of a Database," 1990.

A. Steven, Pollitt, et al., "Hilbrowse for bibiliographic databases", Journal of Information Science, 20(6) 1994.

Peleg M., 1999 "Geobase—Israel in time and space", Paper presented in the SCORUS 1998 Conf. Belfast, 1999.

R.B. Allen, "Navigation and searching in hierarchical digital library catalogs", Proceedings of the 1st Annual Conf. On the Theory and Practice of Digital Libraries, Jun. 19-21, 1994, Texas, USA.

G.M. Sacco, "Dynamic taxonomies: A model for large information bases", IEEE Trans. On Knowledge and Data Engineering, vol. 12, No. 3, May/Jun. 2000.

A. Steven Pollitt, et al., "View-based searching systems—progress towards effective disintermediation", Online Information 96 Proceedings, pp. 445, (Dec. 3-5, 1996).

C. Carpineto, et al., "Ulyssess: A Lattice-based multiple interaction strategy retrieval interface", In /blumenthal. Gornostaev & Unger (Es.), Human-Computer Interaction, 5th Int. Conf . . . EWHCI'95, Moscow, Russia, Jul. 1995.

Amin Vahdat, et al., WebOS: Operating system services for with area applications (1997), Proceedings of the 7th Symp. On High Performance Distributed Computing, (1997).

M. Morohashi, et al., "Information outlining—Filing the Gap between Visualization and Navigation in Digital Libraries", 1995.

K. Takeda, et al. "Information Outlining and Site Outlining", 1997.

R.J. Miller, et al., "Integrating hierarchical navigation and querying" A user customizable solution, ACM multimedia workshop on effective abstractions in multimedia layout, presentation, and interaction, San Francisco, CA, Nov. 1995.

H.P. Kumar, et al., "Browsing hierarchical data with multi-level dynamic queries and pruning", Int. J. Human-Computer Studies (1997) 46, 103-124.

R. Godin, et al., "Design of a browsing interface for information retrieval", 1989.

R.J. Miller, et al., "DataWeb: customizable database publishing for the web", Published in IEEE Multimedia, 4(4):14-21, Oct. 1997.

R.A. Baeza-Yates, et al., "New approach to information management: Attribute-centric data systems", 2000.

Marti A. Hearst, "Interfaces for searching the web", Scientific American, Mar. 1997.

R.A. Baeza-Yates, et al., "Modern Information Retrieval", Jan. 1999.

Susan E. Aldrich, Mercado CSN V3.0 Product Search, Patricia Seybold Group, Feb. 24, 2005.

R.B. Allen, et al., "Two digital library interfaces that exploit hierarchical structure", 1994.

RESULT-BASED TRIGGERING FOR PRESENTATION OF ONLINE CONTENT

RELATED APPLICATION

The present application is a continuation of U.S. patent application Ser. No. 11/497,219 now U.S. Pat. No. 7,493,317, filed 31 Jul. 2006, which claims priority to U.S. provisional patent application Ser. No. 60/729,111 filed 20 Oct. 2006, each of which is incorporated herein by reference in its entirety.

BACKGROUND

1. Field of the Invention

The present invention relates generally to online search engines, and specifically to techniques for rules-based online content presentation.

2. Related Art

Many search engines provide content manipulation tools that modify a result set in order to merchandise particular items. Most basically, search engines present results ranked by their relevance to the user's query, determined by information-retrieval considerations and search algorithms. In addition, some search engines modify the ranking of the results based on additional considerations, such as business considerations. For example, in response to the query "bicycle," a search engine may choose to promote a certain brand within the search results, and display some of the models of this brand among the top ten results.

SUMMARY

Embodiments of the present invention enable rules for manipulating content to be triggered by search results that are returned in response to a query posed by a user. In some of these embodiments, a search and navigation system permits a manager of the content to identify characteristics that may occur in the query results, and to specify rules to be applied by the system when the characteristics appear in the results. Typically, the rules define actions to be taken by the system, such as modifying the order of the result set, adding items to the set that do not necessarily satisfy the query, or presenting content to the user that is outside the scope of the query. This approach expands the range of tools available to the manager for inferring types of content that could be of interest to the user and thus bringing the content to the user's attention.

There is therefore provided, in accordance with an embodiment of the present invention, a computer-implemented method for delivering content, including: specifying a rule having a trigger and defining a content presentation action; receiving a search query from a user; generating a result set in response to the search query; identifying at least one characteristic of the result set; comparing the at least one characteristic to the trigger; and if the at least one characteristic satisfies the trigger, presenting the content as specified by the content presentation action that is defined by the rule.

For some queries, the at least one characteristic is not included in the search query. For some applications, the search query, the at least one characteristic, and the trigger include respective attribute-value pairs. For some applications, the at least one characteristic includes at least one ordered characteristic.

In an embodiment of the present invention, identifying the at least one characteristic includes determining that the at least one characteristic dominates the result set. For example, determining that the at least one characteristic dominates the result set may include determining that the at least one characteristic characterizes at least a threshold percentage of items in the result set. Alternatively, determining that the at least one characteristic dominates the result set may include determining that the at least one characteristic characterizes at least a threshold number of items in the result set.

In an embodiment of the present invention, identifying includes assessing, for each of a plurality of characteristics that include the at least one characteristic, a number of items in the result set that are characterized by the characteristic. For some applications, the plurality of characteristics includes only characteristics included in the trigger.

In an embodiment of the present invention, the trigger specifies a threshold number of items, the at least one characteristic of the result set specifies a number of items in the result set, and presenting the content includes presenting the content as specified by the content presentation action that is defined by the rule responsively to a comparison between the number of items and the threshold number of items. Furthermore, presenting the content may include presenting the content as specified by the content presentation action that is defined by the rule both (a) responsively to the comparison, and (b) upon finding that the query contains a set of one or more characteristics.

For some applications, the trigger specifies a set of one or more items, and comparing the at least one characteristic to the trigger includes determining whether or not the result set contains the items in the specified set.

For some applications, identifying the at least one characteristic of the result set includes identifying a first characteristic of the result set, and a second characteristic of the result set that refines the first characteristic, and identifying the second characteristic, but not the first characteristic, as the at least one characteristic of the result set.

There is further provided, in accordance with an embodiment of the present invention, a computer-implemented method for delivering content, including: specifying a rule, which has a trigger and a threshold and defines a content presentation action; receiving a search query from a user; generating a query result set by searching a corpus of data for items that satisfy the search query; generating a trigger result set by searching the corpus of data for items that satisfy the trigger; determining a level of intersection between the query result set and the trigger result set; and if the level of intersection is greater than the threshold, presenting the content as specified by the content presentation action defined by the rule. For some applications, the search query and the trigger each include at least one attribute-value pair.

In an embodiment of the present invention, determining the level of intersection includes setting the level of intersection equal to a quotient of (i) an assessment of a number of items in a set formed by an intersection of the query and trigger result sets divided by (ii) a divisor, and the divisor is selected from the group consisting of: an assessment of a number of items in the query result set, an assessment of a number of items in the trigger result set, and a sum of the assessment of the number of items in the query result set and the assessment of the number of items in the trigger result set.

Alternatively, determining the level of intersection includes setting the level of intersection equal to an assessment of a number of items in a set formed by the intersection of the query and trigger result sets.

For some applications, generating the trigger result set includes making a record of the trigger result set, and determining the level of intersection includes determining the level of intersection between the query result set and the record of the trigger result set.

There is still further provided, in accordance with an embodiment of the present invention, apparatus for delivering content, including: a search engine, which is configured to receive a search query from a user, and to generate a result set in response to the search query; and a result processor, which is configured to receive a specification of a rule having a trigger and defining a content presentation action, to identify at least one characteristic of the result set, to compare the at least one characteristic to the trigger, and, if the at least one characteristic satisfies the trigger, to present the content as specified by the content presentation action that is defined by the rule.

There is additionally provided, in accordance with an embodiment of the present invention, apparatus for delivering content, including: a result processor, which is configured to receive a specification of a rule, which has a trigger and a threshold and defines a content presentation action; and a search engine, which is configured to receive a search query from a user, to generate a query result set by searching a corpus of data for the items that satisfy the search query, and to generate a trigger result set by searching the corpus of data for the items that satisfy the trigger, wherein the result processor is configured to determine a level of intersection between the query result set and the trigger result set, and, if the level of intersection is greater than the threshold, to present the content as specified by the content presentation action defined by the rule.

There is yet additionally provided, in accordance with an embodiment of the present invention, a computer software product for delivering content, the product including a computer-readable medium in which program instructions are stored, which instructions, when read by a computer, cause the computer to receive a specification of a rule having a trigger and defining a content presentation action, to receive a search query from a user, to generate a result set in response to the search query, to identify at least one characteristic of the result set, to compare the at least one characteristic to the trigger, and, if the at least one characteristic satisfies the trigger, to present the content as specified by the content presentation action that is defined by the rule.

There is also provided, in accordance with an embodiment of the present invention, a computer software product for delivering content, the product including a computer-readable medium in which program instructions are stored, which instructions, when read by a computer, cause the computer to receive a specification of a rule, which has a trigger and a threshold and defines a content presentation action, to receive a search query from a user, to generate a query result set by searching a corpus of data for items that satisfy the search query, to generate a trigger result set by searching the corpus of data for items that satisfy the trigger, to determine a level of intersection between the query result set and the trigger result set, and, if the level of intersection is greater than the threshold, to present the content as specified by the content presentation action defined by the rule.

BRIEF DESCRIPTION OF THE DRAWINGS

The present invention will be more fully understood from the following detailed description of embodiments thereof, taken together with the drawings, in which.

DETAILED DESCRIPTION

Overview

Embodiments of the present invention enable rules for manipulating content to be triggered by search results that are returned in response to a query posed by a user. In some of these embodiments, a search and navigation system permits a manager of the content to identify characteristics that may occur in the query results, and to specify rules to be applied by the system when the characteristics appear in the results. Typically, the rules define actions to be taken by the system, such as modifying the order of the result set, adding items to the set that do not necessarily satisfy the query, or presenting content to the user that is outside the scope of the query. This approach expands the range of tools available to the manager for inferring types of content that could be of interest to the user and thus bringing the content to the user's attention. For some applications, such content manipulation is performed in order to merchandise items in the result set, or other items not found in the result set.

In some embodiments of the present invention, the system identifies characteristics of the result set that dominate the result set. Characteristics are considered dominant if they characterize at least a threshold percentage of the items in the result set, or at least a threshold number of the items in the result set.

These results-based content manipulation techniques enable a manager of the content to perform desired content manipulation actions based on characteristics of items for which a user is searching, even if these characteristics do not appear in the user's query. The manager does not need to define specific triggers for every possible query characteristic that may be associated with a desired content manipulation action.

The following example illustrates some of the differences between these techniques of the present invention and conventional query-based content presentation techniques. Assume a trigger of a content presentation rule is defined as the attribute-value pair brand: Sony®. Using conventional query-based techniques, at least the following attribute-value-based queries would produce a match with the trigger: (a) brand: Sony, and (b) product: stereo AND brand: Sony, and the following queries would fail to produce a match: (c) brand: Toshiba®, and (d) product: stereo.

Using these techniques of the present invention, the above-mentioned queries (a) and (b) would also produce a match, because all of the items in the result set are characterized by brand: Sony, and query (c) would still fail to produce a match, because none of the results for brand: Toshiba are characterized by brand: Sony. However, in contrast to conventional query-based content presentation techniques, query (d) (product: stereo) would also produce a match if the items in the result set are dominated by Sony, e.g., if at least 40% of the items in the result set are characterized by brand: Sony, assuming a threshold setting of 40%. These techniques thus enable the manager to determine that the user has a potential interest in Sony, which interest was not detectable in the information provided by the query alone. The hypothetical connection in this example between stereo products and the particular brand is entirely data-driven.

In some embodiments of the present invention, the system generates (a) a query result set in response to a user query provided as input to the search engine, and (b) a trigger result set in response to a trigger provided as a query input to the search engine. The system performs a content manipulation action upon finding a threshold level of intersection between the query result set and the trigger result set.

System Description

Figure 1:
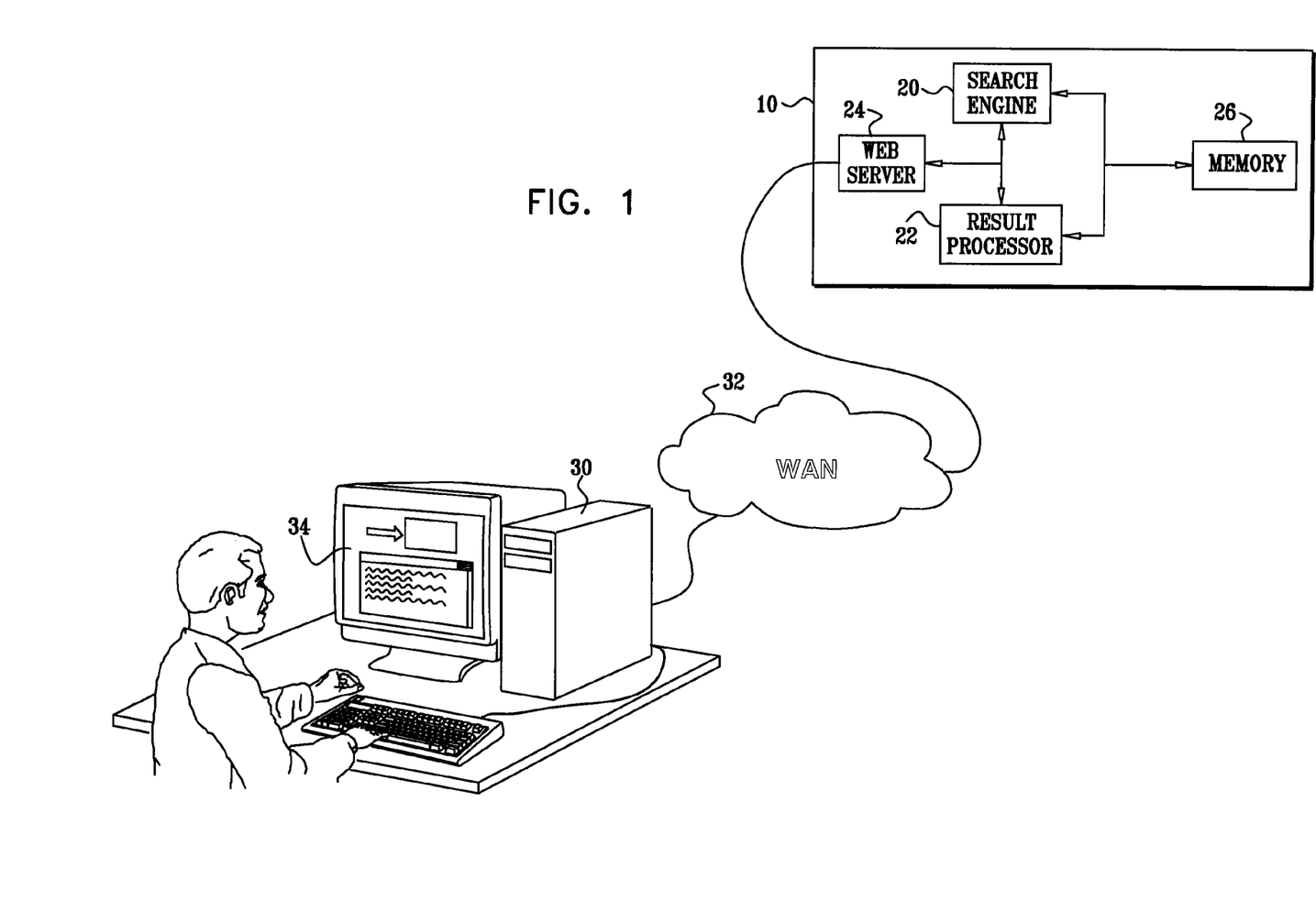
FIG. 1 is a schematic illustration of a search and navigation system 10, in accordance with an embodiment of the present invention.

FIG. 1 is a schematic illustration of a search and navigation system 10, in accordance with an embodiment of the present invention. System 10 comprises a search engine 20, a result processor 22, an interface, such as a web server 24, and a memory 26. System 10 provides searching and navigation of items stored in memory 26. Typically, system 10 comprises one or more standard computer servers with appropriate memory, communication interfaces and software for carrying out the functions prescribed by the present invention. This software may be downloaded to the system in electronic form over a network, for example, or it may alternatively be supplied on tangible media, such as CD-ROM.

A user, such as a customer, uses a workstation 30, such as a personal computer, to remotely access system 10 via a wide-area network (WAN) 32, such as the Internet. Typically, a web browser 34 of workstation 30 communicates with web server 24. The web browser facilitates entry of search queries, and displays search results.

Result processor 22 implements one or more content presentation rules, which include respective triggers and content presentation actions to be performed upon satisfaction of the triggers. Such content presentation actions may include, for example, modifying the order of the result set, adding items to the set that do not necessarily satisfy the query, or presenting content to the user that is outside the scope of the query. System 10 presents content associated with the result set, as specified by the content presentation actions corresponding to the satisfied triggers of the rules.

Each of the triggers comprises a set of one or more characteristics that characterize items in memory 26. The characteristics are typically expressed as one or more attribute-value pairs (notated herein as a:v), one or more free text searches, or a combination of attribute-value pairs and free text searches. Memory 26, or another element of system 10, contains at least one index that associates characteristics with items in the memory. Memory 26 may be part of system 10 (such as part of one or more of search engine 20 and/or result processor 22), or may be distributed in other physical locations.

For applications in which the characteristics are expressed as attribute-value pairs, each trigger can be expressed as follows:

$$t = a_1:v_1 \text{ operator } a_2:v_2, \ldots, \text{ operator } a_n:v_n \quad \text{(Equation 1)}$$

wherein $a_i$ is an attribute and $v_i$ is a value of $a_i$, and the operators are typically Boolean operators, such as AND, OR, NOT, and parentheses. The same attribute may appear more than once in a given trigger, with each occurrence having a different value. For some applications, additional attribute-value pairs are provided to control the results of a query, which pairs are not directly related to attributes of items in memory 26. For example, such attribute-value pairs may indicate a desired sort order, a desired page number, or a desired currency for displaying prices. Furthermore, attribute-value pairs may include additional information, such as display information. For example, the attribute-value pair brand: 14: 'Sony' may indicate a that the attribute "brand" has as its value a brand code of 14, which is to be displayed as "Sony."

For some applications, free text searches are expressed as attribute-value pairs, in which the attribute is a generic indicator of a free text search, and the value is the free text. Alternatively, the attribute name is not an actual specific attribute, but instead indicates the kind of free search to be carried out, e.g., a search by author, or a search by title. For example, the author search may actually refer to author first name and author last name fields.

Content presentation rules are expressed most simply as (trigger, action). (For some applications, such rules have more complex structures, such as the specification of a plurality of actions, or the use of a Boolean expression including a plurality of triggers.) Result processor 22 evaluates the trigger by determining whether appropriate attribute-value pairs of the trigger, as specified by the trigger's Boolean operators, match at least one attribute-value pair of an input, such as a query, or a characterization of a result set, as described hereinbelow. If so, the trigger is true, the rule is said to fire, and the action is performed; if not, the trigger is false, the rule does not fire, and the action is not performed. (For triggers that simply include a list of one more attribute-value pairs related to one another by an implied AND, the result processor evaluates the trigger by determining whether each attribute-value pair of the trigger matches at least one attribute-value pair of the input.)

For hierarchical attributes, a trigger characteristic a:v' is considered to match an input characteristic a:v' if v' refines v, i.e., the set of items characterized by a:v' is a subset of the set of items characterized by a:v. For some applications, a rule is triggered if the value v' of an input characteristic a:v' refines a value v of a trigger characteristic a:v.

For ordered attributes, which have a fully ordered domain of values, such as price or date, a trigger characteristic a[n1, n2] is considered to match an input characteristic a[n1',n2'] if [n1',n2'] is a sub-range of [n1,n2], i.e., n1<=n1' and n2'<=n2. For some applications, for free text attributes, a trigger characteristic a:v is considered to match an input characteristic a:v' if v is identical to v', or if there is a linguistic association between v and v', as is known in the search engine art. Alternatively, result-set-based triggering can be used for a similar purpose, without resorting to defining satisfaction for individual trigger components.

Memory 26 contains one or more data structures including items and information describing the items, such as attributes of the items. For example, the data structures may include one or more indices or tables having entries, each of which includes an attribute-value pair and an associated item. The tables may be stored in an multi-dimensional array, a linked list, a link list of arrays, or another appropriate data structure known in the art. Alternatively or additionally, memory 26 may comprise one or more databases, such as relational databases. Memory 26 generally further includes data structures that define relationships among at least some of the attribute-value pairs, such as hierarchical relationships.

Figure 2:
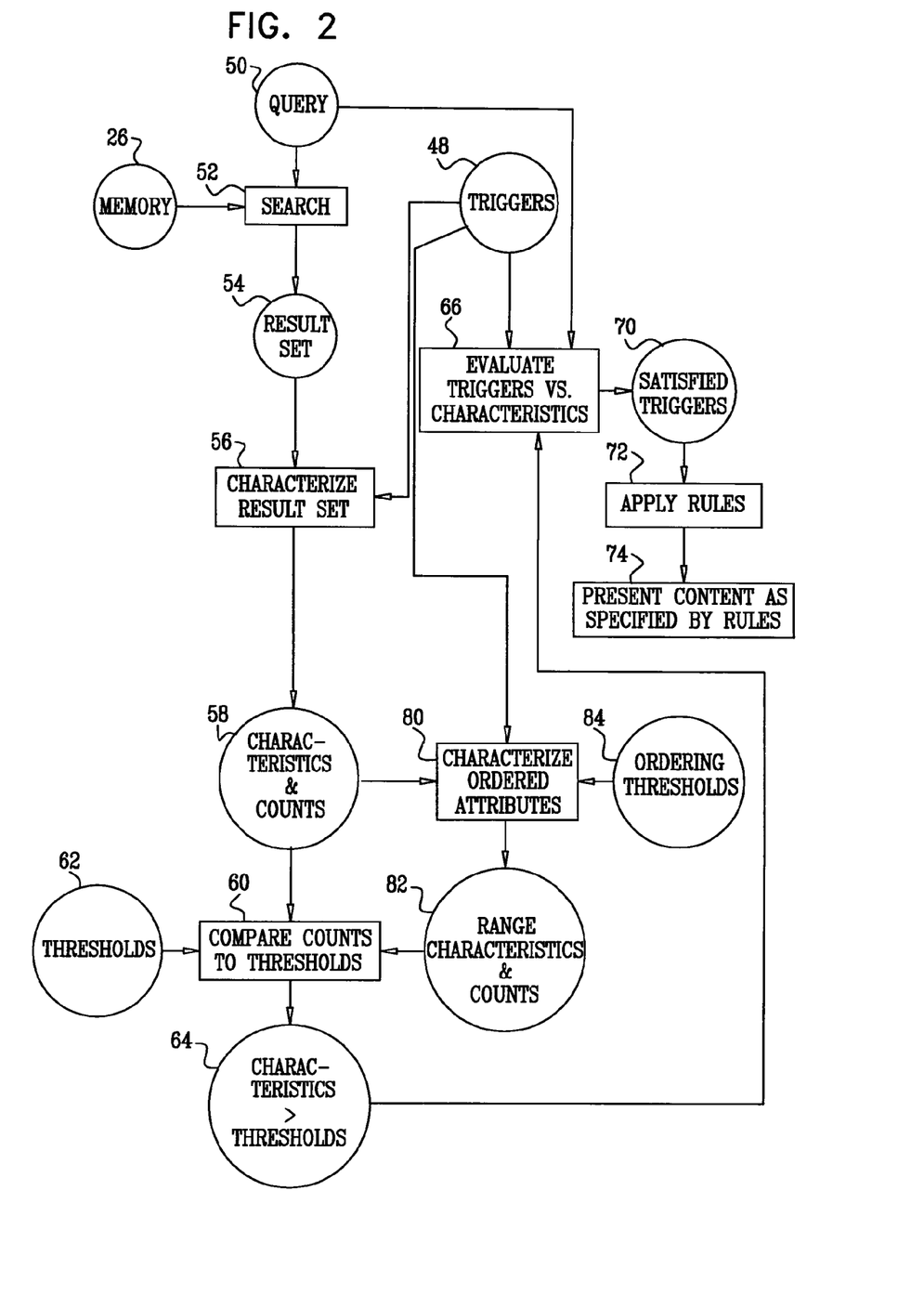
FIG. 2 is a flow chart that schematically illustrates a method for performing result-characteristics-based triggering, in accordance with an embodiment of the present invention.

Reference is made to FIG. 2, which is a flow chart that schematically illustrates a method for performing result-characteristics-based triggering, in accordance with an embodiment of the present invention. Result processor 22 uses this method to evaluate triggers 48 against input characteristics that include (a) a query 50, and (b) inferred characteristics of the result set for the query. Alternatively, the input characteristics include only the inferred characteristics of the result set, and not query 50.

The method receives as input query 50, which, as described hereinabove, is typically expressed as attribute-value pairs, attribute-range-value pairs, and/or attribute-free text pairs. At a search step 52, search engine 20 (FIG. 1) searches query 50 against memory 26, and outputs a result set 54 containing zero or more items from memory 26.

Result processor 22 begins the characterization of the result set by assessing, for each attribute-value pair, the number of items in result set 54 that are characterized by the attribute-value pair, at a result set characterization step 56. Such assessing typically comprises counting, either exactly or approximately, the number of items. For some applications, the result processor performs such assessing for all attribute-value pairs that have been indexed in memory 26, while for other applications, the result processor performs such assessing only for attribute-pairs that are included in at least one of triggers 48. In order to facilitate such assessing, memory 26 typically includes an index, such as of (items, attribute names) mapped to attribute values. It is noted that often more than one attribute-value pair per attribute is assessed. The result of the characterization is a set 58 of characteristics (e.g., attribute-value pairs) and corresponding assessments of items from result set 54 that map to the characteristics.

For hierarchical attributes, such as those that define categories, result processor 22 optionally characterizes each item by the most specific attribute value that is applicable to the item. In other words, if an item is characterized by both attribute-value pair a:v and a:v', wherein v' refines v, result processor 22 characterizes the item by a:v' rather than a:v, assuming that v' is above the applicable threshold.

At a threshold comparison step 60, result processor 22 compares the assessments of each attribute of set 58 to one or more thresholds 62. Thresholds 62 are specified globally, per attribute, per trigger 48, or per each attribute of each trigger 48. For some applications, the thresholds are expressed as item assessments, such as exact or approximate counts. For some applications, the thresholds are expressed as a percentage of the total number of items in result set 54 (or, equivalently, a range from 0 to 1, or another ratio). For example, the percentage may be at least 40%, such as at least 50%, 60%, 70%, or 80%. Alternatively or additionally, all or a portion of the thresholds are expressed as absolute numbers. Result processor 22 outputs a set 64 of those characteristics of set 58 that exceed the threshold(s) (as mentioned above, when trigger-specific thresholds are provided, this comparison is performed using the trigger-specific thresholds). The result processor thus identifies one or more characteristics that dominate result set 54. For some applications, the result processor is configured to identify only a subset of the characteristics found, such as a single dominant characteristic (such as the most dominant characteristic), even in result set characterizations in which multiple characteristics are found. Alternatively, for some applications, the result processor is configured to identify only a single dominant characteristic per attribute.

At a trigger evaluation step 66, result processor 22 evaluates each of triggers 48 against (a) set 64 of the characteristics that exceed the threshold(s), and (b) query 50. Alternatively, the result processor evaluates trigger 48 only against set 64. Such evaluation is performed as described hereinabove with reference to FIG. 1. Based on this evaluation, the result processor outputs a set 70 of satisfied triggers. At a rule application step 72, the system performs appropriate content presentation actions for the satisfied triggers, based on the content presentation rules, as described hereinabove, and presents content to the user as specified by the rules, at a content presentation step 74. Typically, such content relates to at least a portion of result set 54, and includes additional content as specified by the rules.

For some applications, a trigger is satisfied upon finding that result set 54 is not dominated by the one or more characteristics of the trigger. For some applications, a trigger is satisfied upon finding that result set 54 contains exactly a certain number of items characterized by the one or more characteristics of the trigger, or less than a threshold number of items characterized by the one or more characteristics of the trigger.

In an embodiment of the present invention, the result-characteristics-based triggering described hereinabove with reference to FIG. 2 supports ordered attributes. As mentioned above with reference to FIG. 1, an ordered-attribute trigger takes the form of a[n1,n2], wherein n1 and n2 are the lower and upper bounds, respectively, of the range of values of the attribute. Ordered attributes commonly include price and date. The attribute-value pair for any single given item in memory 26 is expressed as a:n, i.e., the item typically has only a single value n for the attribute a, e.g., a price of $10.

For supporting ordered attributes, the method of FIG. 2 includes, at an ordered attribute characterization step 80, further characterizing those characteristics of set 58 which are ordered (as mentioned above, set 58 is produced at result set characterization step 56). Such further characterization results in a set 82 of range characteristics and corresponding counts of items from result set 54 that map to the range. In other words, set 82 includes one or more attribute-value ranges a[n1,n2] and corresponding counts. At threshold comparison step 60, result processor 22 compares the counts of each attribute-value range of set 82 to thresholds 62. Attribute-value ranges having a count that exceeds an appropriate threshold (either in absolute terms, or as a percentage, as described hereinabove with reference to step 60) are included in output set 64.

In accordance with a first technique for characterizing ordered attributes at step 80, result processor 22 receives as input a set of desired ordering thresholds 84. Each of ordering thresholds 84 are typically expressed as a percentage of the total items in result set 54. Optionally, one or more of thresholds 62 serve as one or more of ordering thresholds 84. For each ordered attribute a:n in set 58 and each ordering threshold 84, result processor 22 produces one or more attribute-value ranges a: [n1,n2] by (a) setting n1 equal to n, and (b) setting n2 equal to the lowest possible value of attribute a greater than n1 such that the quotient of (i) the sum of counts for a:n in set 58 over all n in [n1,n2] divided by (ii) the total number of items in result set 54, is greater than the ordering threshold. Alternatively n2 is set to n, or n1 and n2 are set such that n falls between n1 and n2, such as at the midpoint of n1 and n2. Result processor 22 outputs as set 82 each of the thus determined attribute-value ranges a: [n1,n2] and its corresponding count of items in result set 54. It is noted that this technique for characterizing ordered attributes does not require knowledge of triggers 48, and thus may be used for purposes other than triggering.

In accordance with a second technique for characterizing ordered attributes at step 80, for each attribute-value range a: [n1,n2] included in at least one trigger 48, result processor 22 sums the counts for a:n in set 58 over all n in [n1,n2], and outputs as set 82 each of the attribute value ranges and its corresponding summed count of items in result set 54.

In accordance with a third technique for characterizing ordered attributes at step 80, result processor 22 receives as input a set of desired ordering thresholds 84, which are expressed as a set of ranges, or parameters for deriving a set of ranges from the ranges provided by triggers 48. For example, the endpoints of the ranges may be multiples of $10, such that the ranges are [$0,$10], [$10,$20], [$20,$30], . . . . Result processor 22 sums the counts for a:n in set 58 over all n in each of the ranges, and outputs as set 82 each of the attribute value ranges and its corresponding summed count of items in result set 54.

In accordance with an alternative method for supporting ordered attributes, the method of FIG. 2 does not include step 80. Instead, ordered attributes-value pairs included in set 58 are retained as single-value attribute-value pairs. At a combined threshold comparison step 60 and trigger evaluation step 66, an attribute-range trigger is satisfied if the sum of the item counts falling within the range defined by the trigger exceeds a threshold value.

(It is noted that these attribute-range techniques produce precise results only if none of the unique items in result set 54 includes more than one value for a given attribute. Unique items could include more than value, for example, if a given item has two different SKUs with different respective prices. If any items include more than one value, summing the counts for such items may count a given unique item more than once. For some applications, result processor 22 is configured to ignore such overlaps, in which case the results of the method of FIG. 2 are approximate. Additional methods for counting can also provide approximate counts utilizing less processing power, such as random sampling. Alternatively, to arrive at precise results, the result processor determines unions of sets of items mapping to each characteristic, such that overlapping items are not counted more than once.)

In the embodiments described hereinabove, result processor 22 generally uses triggers that have the same structure as queries and inferred characteristics of the result set, such as attribute-value pairs. In an embodiment of the present invention, result processor 22 uses triggers of different types, which are particularly appropriate for evaluating result set characteristics, either alone or in combination with query characteristics. Such triggers typically do not include attribute-value pairs, and thus are evaluated independently of the characterization method described hereinabove with reference to FIG. 2. For some applications, the implementation of the content presentation rules is modified to accommodate such triggers.

Such triggers may include, for example: the result set contains more than, less than, or equal to a threshold number of items; the result set contains more than, less than, or equal to a threshold number of items, and the query contains one or more characteristics. For example, the trigger may be that the result set contains less than 10 items, and the query includes the attribute-value pair brand:Sony; and the result set contains or does not contain one or more particular items.

In an embodiment of the present invention, system 22 uses the characterization of a plurality of result sets to alert a manager of the content to potentially interesting patterns in the result sets and/or the search queries. Such alerts may include suggestions to the manager of new rules and/or new triggers. For example, the system may keep track of queries that produce result sets having fewer than a threshold number of items, such as empty result sets, and may notify the manager of frequent queries that are producing such result sets. The system may also notify the manager upon finding that the result sets of certain queries are dominated by certain characteristics that have not yet been included in any rules. Alternatively or additionally, the system creates reports and statistics that are enhanced with inferred characteristics.

Figure 3:
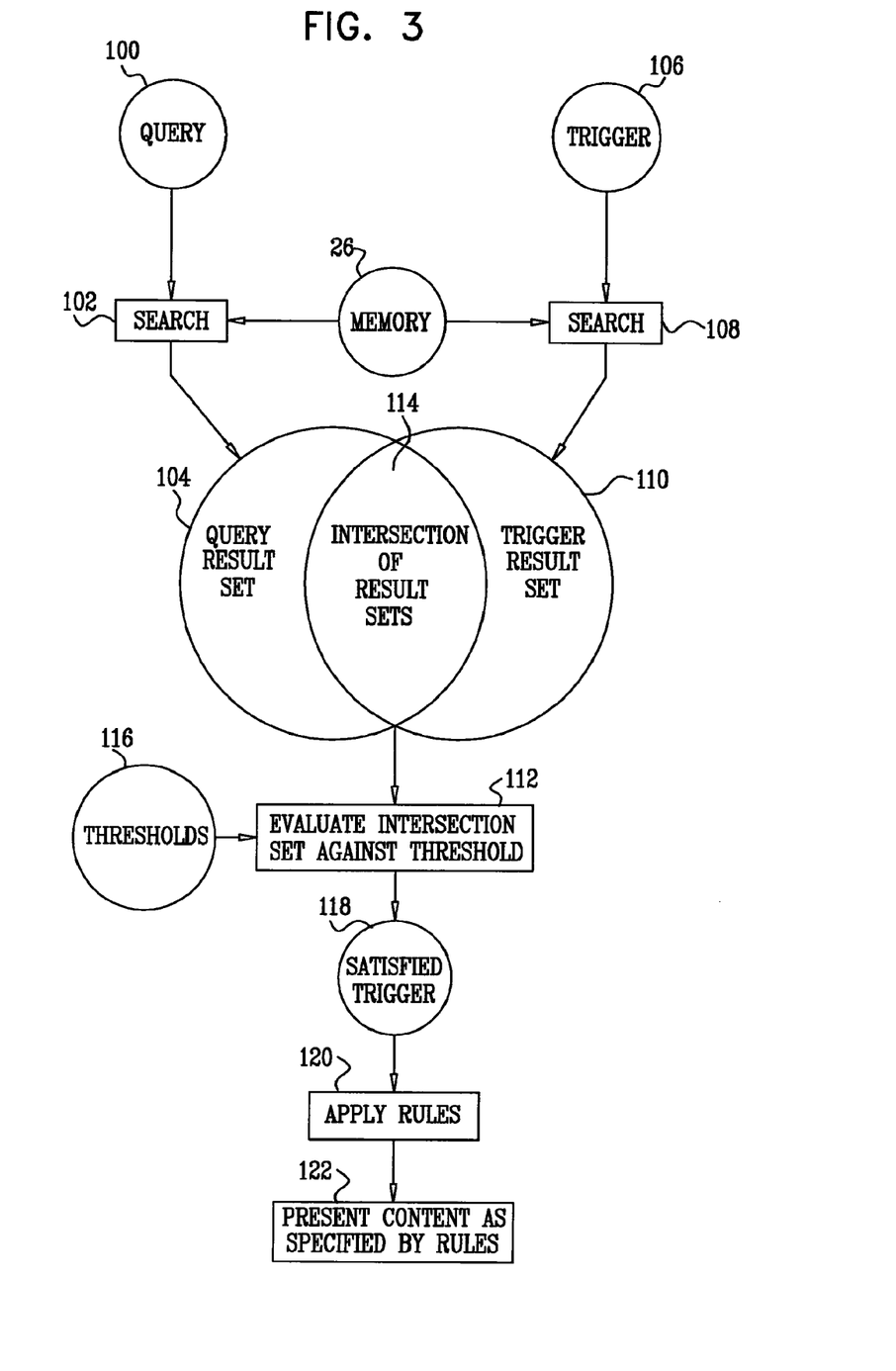
FIG. 3 is a flow chart that schematically illustrates a method for performing result-set-based triggering, in accordance with an embodiment of the present invention.

Reference is now made to FIG. 3, which is a flow chart that schematically illustrates a method for performing result-set-based triggering, in accordance with an embodiment of the present invention. This embodiment provides an alternative technique for satisfying triggers, and may be used separately or in combination with the triggering techniques described hereinabove.

The method receives as input query 100, which, as described hereinabove, is typically expressed as attribute-value pairs, attribute-range-value pairs, and/or free text searches. At a search step 102, search engine 20 applies a search algorithm to search memory 26 for items that satisfy the query, and outputs a query result set 104 for the query, which set contains zero or more items from memory 26.

The method also receives as input a set of at least one trigger 106, which, as described hereinabove, includes one or more characteristics, which are typically expressed as attribute-value pairs, attribute-range-value pairs, and/or free text searches. At a search step 108, search engine 20 applies the search algorithm to search memory 26 for items that satisfy trigger 106 when the trigger is regarded as a query, and outputs a trigger result set 110 for the trigger. In other words, search engine 20 interprets trigger 106 as a query. For applications in which trigger 106 comprises a Boolean expression, as described hereinabove with reference to Equation 1, searching memory 26 includes evaluating the Boolean expression, as is known in the search engine art.

At an intersection evaluation step 112, result processor 22 determines an intersection set 114 that includes all items that are found in both query result set 104 and trigger result set 110. The content manager compares (a) the quotient of an assessment of the number of items in intersection set 114 divided by the number of items in query result set 104 with (b) a threshold 116. For example threshold 116 may be at least 50%, such as at least 60% or 75%. (Alternatively, the divisor is an assessment of the number of items in trigger result set 110, or the sum of the assessments of the number of items in the query and trigger result sets 104 and 110.) The assessment of the number of items is typically performed by counting the number of items, either exactly or approximately. If the quotient is greater than threshold 116, the result processor determines that trigger 106 is a satisfied trigger 118. At a rule application step 120, the system performs the appropriate content presentation action for satisfied trigger 118, based on the content presentation rules, as described hereinabove, and presents content to the user as specified by the rules, at a content presentation step 122.

Alternatively, at intersection evaluation step 112, result processor 22 compares (a) an assessment of the number of items in intersection set 114 with (b) threshold 116. The assessment of the number of items is typically performed by counting the number of items, either exactly or approximately. If the number of items is greater than threshold 116, the result processor determines that trigger 106 has been satisfied.

Result processor 22 repeats steps 108 through 112 to evaluate each of a plurality of triggers 106. A global threshold 116 may be used for evaluating the plurality of triggers 106, or a separate trigger may be provided for each of the triggers.

For some applications, rather than determine trigger result set 110 separately for each received query 100, system 22 makes a record of trigger result set 110 and uses the record for evaluating a plurality of queries 100. For example, system 22 may cache trigger result set 110 for each trigger 106, and reuse the cached result sets for evaluating a plurality of queries 100. The cached result sets are recomputed or flushed from the cache upon changes to memory 26 or to trigger 106. Alternatively, the system makes such a record using an index, a mapping, or a data structure, which provides, for each item in memory 26, the triggers in whose trigger results the item appears.

In some embodiments of the present invention, one or more of the functions described herein as being performed by result processor 22 are instead performed by a module of search engine 20.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A computer readable medium having stored thereon one or more sequences of instructions for causing one or more microprocessors to perform the steps for delivery of content from a corpus of data, the steps comprising:
   specifying a rule having a trigger that identifies at least one characteristic corresponding to a plurality of items in a corpus of data;
   defining a content presentation action to be performed responsively to the trigger;
   receiving a search query for searching the corpus;
   generating a result set in response to the search query, the search query result set including one or more items from the corpus;
   determining a percentage of items in the search query result set that correspond to said at least one characteristic;
   identifying a threshold percentage, wherein the threshold percentage is a predetermined percentage of the total number of items in the search query result set;
   comparing the determined percentage of items to the threshold percentage; and
   presenting content in accordance with the content specification action when the determined percentage of items exceeds the threshold percentage.

2. The medium according to claim 1, wherein the at least one characteristic is not included in the search query.

3. The medium according to claim 1, wherein the at least one characteristic is expressed as at least one attribute-value pair.

4. The medium according to claim 1, wherein the at least one characteristic includes at least one ordered characteristic.

5. The medium according to claim 1, wherein said comparing step further comprises identifying a first characteristic for the item, identifying a second characteristic for the item that refines the first characteristic, and using the second characteristic, but not the first characteristic, as the at least one characteristic.

6. The medium according to claim 1, wherein the threshold percentage is at least 40%.

7. A system for delivering content from a corpus of data including a plurality of items, comprising:
   means for receiving a search query, searching the corpus of data, and generating a search query result set that includes one or more items from the corpus of data;
   means for identifying a rule having a trigger that specifies at least one characteristic corresponding to a plurality of items in a corpus of data and defines a content presentation action to be performed responsively to the trigger;
   means for determining a percentage of items in the search query result set that correspond to said at least one characteristic and comparing the determined percentage of items to a predetermined threshold percentage; and
   means for presenting content in accordance with the content specification action when the determined percentage of items exceeds the threshold percentage.

8. The system of claim 7, wherein the at least one characteristic is not included in the search query.

9. The system of claim 7, wherein the at least one characteristic is expressed as at least one attribute-value pair.

10. The system of claim 7, wherein the at least one characteristic includes at least one ordered characteristic.

11. The system of claim 7, wherein the threshold percentage is a predetermined percentage of the total number of items in the search query result set.

12. The system of claim 7, wherein the threshold percentage is at least 40%.

13. A computer readable medium having stored thereon one or more sequences of instructions for causing one or more microprocessors to perform the steps for delivery of content from a corpus of data, the steps comprising:
   receiving a search query;
   generating a search query result set by searching a corpus of data for items that satisfy the search query;
   identifying a trigger query, said trigger query associated with a content presentation action;
   generating a trigger query result set by searching the corpus of data for items that satisfy the trigger query;
   determining a level of intersection between the search query result set and the trigger query result; and
   presenting content as specified by the content presentation action when said level of intersection is greater than a predetermined threshold.

14. The medium according to claim 13, wherein the search query and the trigger query each include at least one attribute-value pair.

15. The medium according to claim 13, wherein said level of intersection is determined by dividing the number of items in the intersection of the search query results and the trigger query results sets by the number of items in the search query result set.

16. The medium according to claim 13, wherein said level of intersection is determined by dividing the number of items in the intersection of the search query results and the trigger query results sets by the number of items in the trigger query result set.

17. The medium according to claim 13, wherein said level of intersection is determined by dividing the number of items in the intersection of the search query results and the trigger query results sets by the sum of the number of items in the search query result set and the number of items in the trigger query result set.

18. A system for delivering content from a corpus of data including a plurality of items, comprising:
   means for identifying a rule having a trigger that specifies a trigger query, and defines a content presentation action to be performed responsively to the trigger;
   means for receiving a search query and generating a search query result set by searching a corpus of data for items that satisfy the search query;
   means for generating a trigger query result set by searching the corpus of data for items that satisfy the trigger query; and
   means for presenting content corresponding to the content presentation action when the level of intersection between the user query result set and the trigger query result set is greater than a predetermined threshold.

19. The system of claim 18, wherein the search query and the trigger query each include at least one attribute-value pair.

20. The system of claim 18, wherein said level of intersection is determined by dividing the number of items in the intersection of the search query results and the trigger query results sets by the number of items in the search query result set.

21. The system of claim 18, wherein said level of intersection is determined by dividing the number of items in the intersection of the search query results and the trigger query results sets by the number of items in the trigger query result set.

22. The system of claim 18, wherein said level of intersection is determined by dividing the number of items in the intersection of the search query results and the trigger query results sets by the sum of the number of items in the search query result set and the number of items in the trigger query result set.

23. A method for delivery of content from a corpus of data, the method implemented by a computer system including a search engine, a result processor, an interface, and a memory, the method comprising:

receiving a search query for searching the corpus;

generating a result set in response to the search query, the search query result set including one or more items from the corpus;

identifying a characteristic corresponding to a plurality of items in the search query result set;

identifying a rule corresponding to said characteristic, said rule defining a content presentation action;

determining a percentage of items in the search query result set that correspond to said characteristic;

comparing the determined percentage of items to a threshold percentage, wherein the threshold percentage is a predetermined percentage of the total number of items in the search query result set; and presenting content in accordance with the content specification action when the determined percentage of items exceeds the threshold percentage.

24. The method of claim 23, wherein presenting content in accordance with the content specification action comprises presenting items from the corpus of data that are not in the search query result set.

25. The method of claim 23, wherein presenting content in accordance with the content specification action comprises modifying the order of the search query result set.

26. The method of claim 23, wherein presenting content in accordance with the content specification action comprises adding items to the search query result set that do not satisfy the search query.

* * * * *